(12) United States Patent
Lagemann et al.

(10) Patent No.: US 9,449,648 B2
(45) Date of Patent: Sep. 20, 2016

(54) ARRANGING AUDIO OR VIDEO SECTIONS

(75) Inventors: Ole Lagemann, Hamburg (DE); John Danty, SW Calgary (CA); Jan-Hinnerk Helms, Hamburg (DE); Gerhard Lengeling, Los Altos, CA (US); Alexander Soren, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 1796 days.

(21) Appl. No.: 11/834,667

(22) Filed: Aug. 6, 2007

(65) Prior Publication Data

US 2009/0044119 A1 Feb. 12, 2009

(51) Int. Cl.
*G06F 3/03* (2006.01)
*G11B 27/34* (2006.01)
*G11B 27/034* (2006.01)

(52) U.S. Cl.
CPC ........... *G11B 27/34* (2013.01); *G11B 27/034* (2013.01); *G10H 2220/106* (2013.01)

(58) Field of Classification Search
CPC ........................................................ G06F 3/00
USPC ...................... 715/719, 723; 386/52; 725/37
See application file for complete search history.

(56) References Cited

U.S. PATENT DOCUMENTS

| | | | |
|---|---|---|---|
| 5,668,639 A * | 9/1997 | Martin ............................ | 380/52 |
| 5,729,255 A * | 3/1998 | Aoki ............................ | 715/723 |
| 5,740,388 A * | 4/1998 | Hunt ............................ | 715/723 |
| 5,745,782 A * | 4/1998 | Conway ........................ | 715/202 |
| 5,812,789 A * | 9/1998 | Diaz et al. .................... | 709/247 |
| 5,872,565 A * | 2/1999 | Greaves et al. .............. | 715/723 |
| 6,222,549 B1 | 4/2001 | Hoddie | |
| 6,952,221 B1 * | 10/2005 | Holtz et al. ................... | 715/723 |
| 7,073,127 B2 * | 7/2006 | Zhao et al. ................... | 715/719 |
| 7,124,366 B2 * | 10/2006 | Foreman et al. ............. | 715/719 |
| 7,574,472 B2 * | 8/2009 | Biby et al. .................... | 709/204 |
| 7,805,678 B1 * | 9/2010 | Niles et al. ................... | 715/716 |
| 7,856,424 B2 * | 12/2010 | Cisler et al. .................. | 707/654 |

(Continued)

OTHER PUBLICATIONS

Hamakawa et al. ("Object composition and playback models for handling multimedia data"; Multimedia Systems (1994) 2:26-35).*

(Continued)

*Primary Examiner* — Amy Ng
*Assistant Examiner* — Meseker Takele
(74) *Attorney, Agent, or Firm* — Fletcher Yoder PC

(57) ABSTRACT

A program product, a graphical user interface, a computer system including such a graphical user interface and method for replacing a first version of an audio and/or video section having a first length by selecting a second version of an audio and/or video section having a second length are described. Such a method comprises selecting the first version having the first length, displaying a first indication showing that the first version is selected, opening a menu associated with the first version offering at least the second version as an alternative to replace the first version, selecting the second version in the menu to replace the first version and displaying a second indication showing that the second version is selected. The second indication replaces the first indication. Some implementations may facilitate replacing one section or piece of audio or video data by another.

21 Claims, 5 Drawing Sheets

500

(56) References Cited

U.S. PATENT DOCUMENTS

| | | |
|---|---|---|
| 2001/0009423 A1* | 7/2001 | Davis et al. ............... 345/723 |
| 2002/0037153 A1* | 3/2002 | Slone ........................ 386/52 |
| 2004/0001079 A1* | 1/2004 | Zhao et al. ............... 345/719 |
| 2004/0001082 A1* | 1/2004 | Said .......................... 345/730 |
| 2004/0085342 A1* | 5/2004 | Williams et al. ......... 345/723 |
| 2006/0129924 A1* | 6/2006 | Nelson et al. ............ 715/530 |
| 2006/0184875 A1* | 8/2006 | Okada et al. ............. 715/516 |
| 2007/0130525 A1* | 6/2007 | Murphy et al. ........... 715/747 |
| 2008/0041220 A1* | 2/2008 | Foust et al. ............... 84/625 |
| 2010/0070923 A1* | 3/2010 | Chuang et al. ............ 715/825 |

OTHER PUBLICATIONS

David Pogue, *GarageBand 2 The Missing Manual*, Aug. 2005, O'Reilly Media, Sebastopol, California, USA [cover, title page and Table of Contents (6 pages total)].

Mary Plummer, *GarageBand 3 Create and Record Music on a Mac*, 2006, Peachpit Press, Berkeley, California, USA [cover, title page and Table of Contents (6 pages total)].

* cited by examiner

ARRANGING AUDIO OR VIDEO SECTIONS

This application relates to arranging audio or video sections.

BACKGROUND

Recently, music or video projects that in the past would have required an array of professional studio equipment, can now be completed in a home or project studio, using a personal computer and readily available resources. A personal computer with a fast processor and enough RAM can serve as a workstation for recording, arranging, mixing, and producing complete music projects, which can be played back on the computer, burnt on a CD or DVD, or distributed over the Internet. Video projects can be produced together with accompanying audio in a similar manner.

In the course of a music project a user may record audio or video sections or load them from a database or from the Internet. Such content may be arranged in different tracks, e.g. assigning one track to each instrument, respectively. Thereafter, the user may change the contents of one or more sections or adjust their arrangement on the timeline.

SUMMARY OF THE DESCRIPTION

In one aspect, a method for replacing a first version of an audio and/or video section having a first length by selecting a second version of an audio and/or video section having a second length is provided. Such a method may feature operations such as displaying a first indication showing the first version, opening a menu associated with the first version offering at least the second version as an alternative to replace the first version, selecting the second version in the menu to replace the first version and displaying a second indication showing that the second version is selected. The second indication replaces the first indication.

Certain implementations may include one or more of the following features. The second version having the second length may be fitted to the first length of the first version so that the second version is made equal in length to the first length.

The second version may be looped one or more times or a fraction thereof if the second length is shorter than the first length or the second version may be cut at the end so that its length is equal to the first length if the second length larger than the first length.

The first version may be adaptable in length by looping its content or cutting its length. The first and/or second indication may provide a visual indication if the first and/or second version is looped.

A menu may be associated with each selected version offering one or more alternatives to the selected versions. The alternatives may have a part of their names in common. The first and/or second indication may contain a name of the selected version and/or a representation indicating the content of the selected version.

These general and specific aspects may be implemented using a method, a program, a program product, a user interface, or a computer system or a data processing system or consumer electronic device or any combination of such implementations.

Certain implementations may have one or more of the following advantages. For example, replacing one section or piece of audio or video data by another is facilitated for a user. The user may want to replace a certain section by a similar one. At least certain embodiments allow an easy and intuitive replacement of such a section of audio or video data by another. For example, after having selected a first version of an audio section, the user may want to replace this version by a similar content. In order to do so, he may open a menu associated with the first version. This menu offers a predefined set of alternative versions from which the user can choose.

At least according to certain implementations, the alternative version being chosen by the user will be fitted in length to the first version of the audio section. This fitting may be accomplished by looping the content of the alternative version if the alternative version is originally shorter than the version to be replaced. However, if the alternative version is longer than the first version which is to be replaced, the alternative version will be cut in length so that the final length is equal to the length of the first version. The first version may itself have been composed by the user by looping or cutting content used for this version. Accordingly, a first version of an audio section can easily be replaced by an alternative version. For such a replacement, the user does not need to memorize details of the version to be replaced, like the start position, the end position, the length or the name. At least certain implementations provide for a procedure where the user can chose an alternative version via a menu which is associated with the currently selected version, and where this alternative version is automatically fitted to the start time and the length of the version to be replaced. Thus, the user does not need to memorize details of the file to be replaced and he does not need to delete the version to be replaced and load a different version which he has to fit himself to the start position and the length of the former version. Accordingly, at least certain implementations provide an easier and more intuitive handling. The accessibility of alternative versions is improved. Similar advantages can be achieved for replacing video sections or a combination of video and audio sections.

Other aspects, features, and advantages will be apparent from the following detailed description, the drawings, and the claims.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Inc., 2007.

Figure 1:
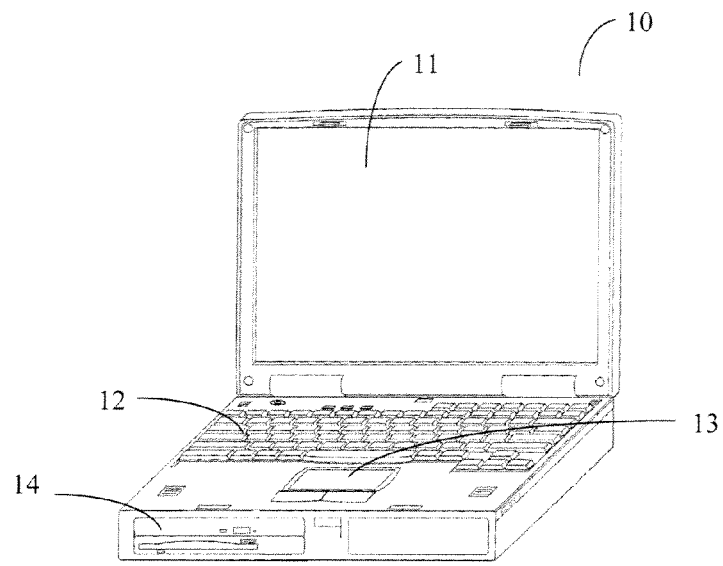
FIG. 1 is a schematic view of a computer.

FIG. 1 illustrates a data processing system 10 such as a computer system which may include a graphical user interface which is displayed on a display device such as a screen. The computer system comprises a screen 11 which is connected to a processing system incorporating a processor and a memory such as a semiconductor memory (e.g. RAM) and/or a magnetic memory. The computer system may also include a keyboard 12, a touch pad 13 and a mouse (not shown) connected electrically to the processing system.

The processing system 10 includes, in one embodiment, system computer software for controlling the computer system. The software also includes control of the graphical user interface. The software may be downloaded from a server through a network or stored on an optical media, such as CD-ROM 14 or stored on other machine readable media (e.g. a non-volatile memory such as a magnetic hard drive or flash memory).

The processing system 10 may be used for recording, arranging, mixing, and producing complete music and/or video projects, which can be played back, burnt on a CD or DVD, or distributed over the Internet.

The present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CDROMs, and magneticoptical disks, readonly memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

FIG. 2B of U.S. Pat. No. 6,222,549, which is hereby incorporated herein by reference, shows one example of a data processing system, such as a computer system, which may be used with the present invention. Note that while this Figure illustrates various components of a data processing system, it is not intended to represent any particular architecture or manner of interconnecting the components as such details are not germane to the present invention. It will also be appreciated that network computers, personal digital assistants (PDAs), cellular telephones, handheld computers, special purpose computers, entertainment systems and other data processing systems and consumer electronic devices which have fewer components or perhaps more components may also be used with the present invention. The system of this Figure may, for example, be a Macintosh computer from Apple Inc.

A machine readable medium includes any mechanism for storing or transmitting information in a form readable by a machine (e.g., a computer). For example, a machinereadable medium includes read only memory ("ROM"); random access memory ("RAM"); magnetic disk storage media; optical storage media; flash memory devices; electrical, optical, acoustical or other form of storage systems.

It will be apparent from this description that aspects of the inventions may be embodied, at least in part, in software. That is, the techniques may be carried out in a computer system or other data processing system in response to its processor or processing system executing sequences of instructions contained in a memory, such as RAM, etc. In various embodiments, hardwired circuitry may be used in combination with the software instructions to implement the present inventions. Thus, the techniques are not limited to any specific combination of hardware circuitry and software, nor to any particular source for the instructions executed by the data processing systems.

Figure 2:
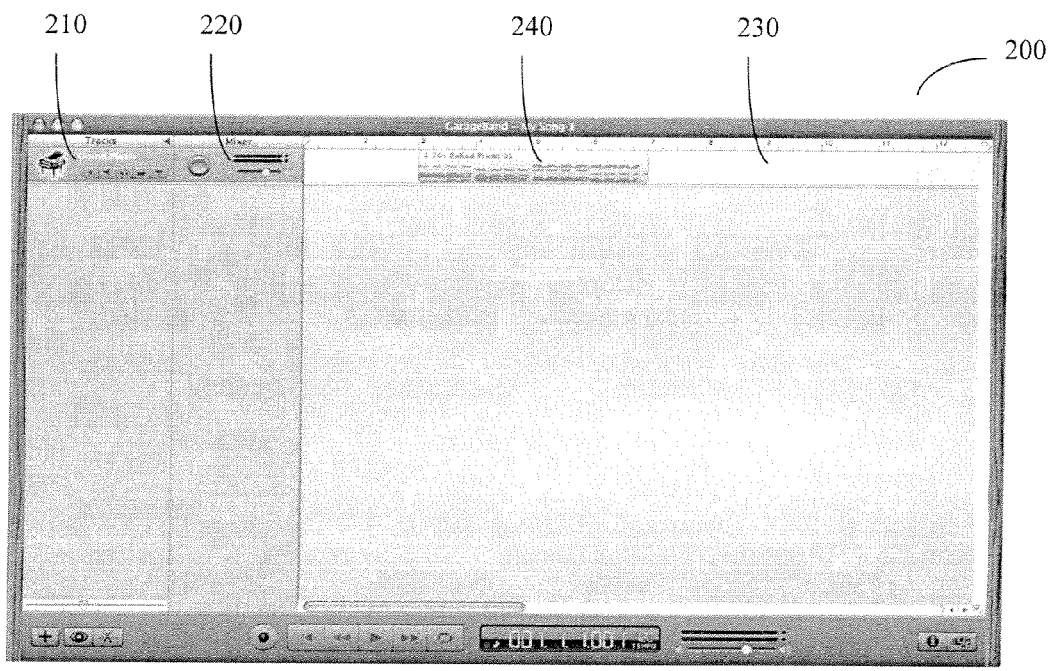
FIG. 2 is a schematic view of a user interface for producing a music project.

FIG. 2 shows an example of a user interface 200 of a program which can be used for the above mentioned purposes. Additional menu bars may be provided. In this assembly, the user interface 200 lists tracks in the left most column. The example shown features one track 210 with a piano assigned to it. The piano may be replaced by any other instrument. Further tracks with the same or other instruments or MIDI tracks may be added as needed. The user interface 200 shows a mixer 220 in the column next to the tracks. The mixer 220 is assigned to the track 210 and can be used to manipulate the output of the track 210 by e.g. changing the pan or the volume. The third column being the right most one of the user interface 200 shows the arrange area. The arrange area gives an indication of the content of the audio data belonging to the different tracks. The first line 230 of the arrange area belongs to the track 210. The first line 230 shows a version 240 of an audio section which will be discussed in more detail below. The user interface 200 also features at the bottom an area with buttons for e.g. starting and stopping playback or recording along with other options.

In a particular implementation, the version 240 of the audio section may be loaded from a predefined set of audio content. Such content may be stored in a database or may be downloaded from the Internet or be obtained through a network from another processing system. It is also possible to load a certain audio section from a database and that a corresponding track with an associated instrument and mixer is automatically created when inserting this audio section into the arrange area.

Figure 3:
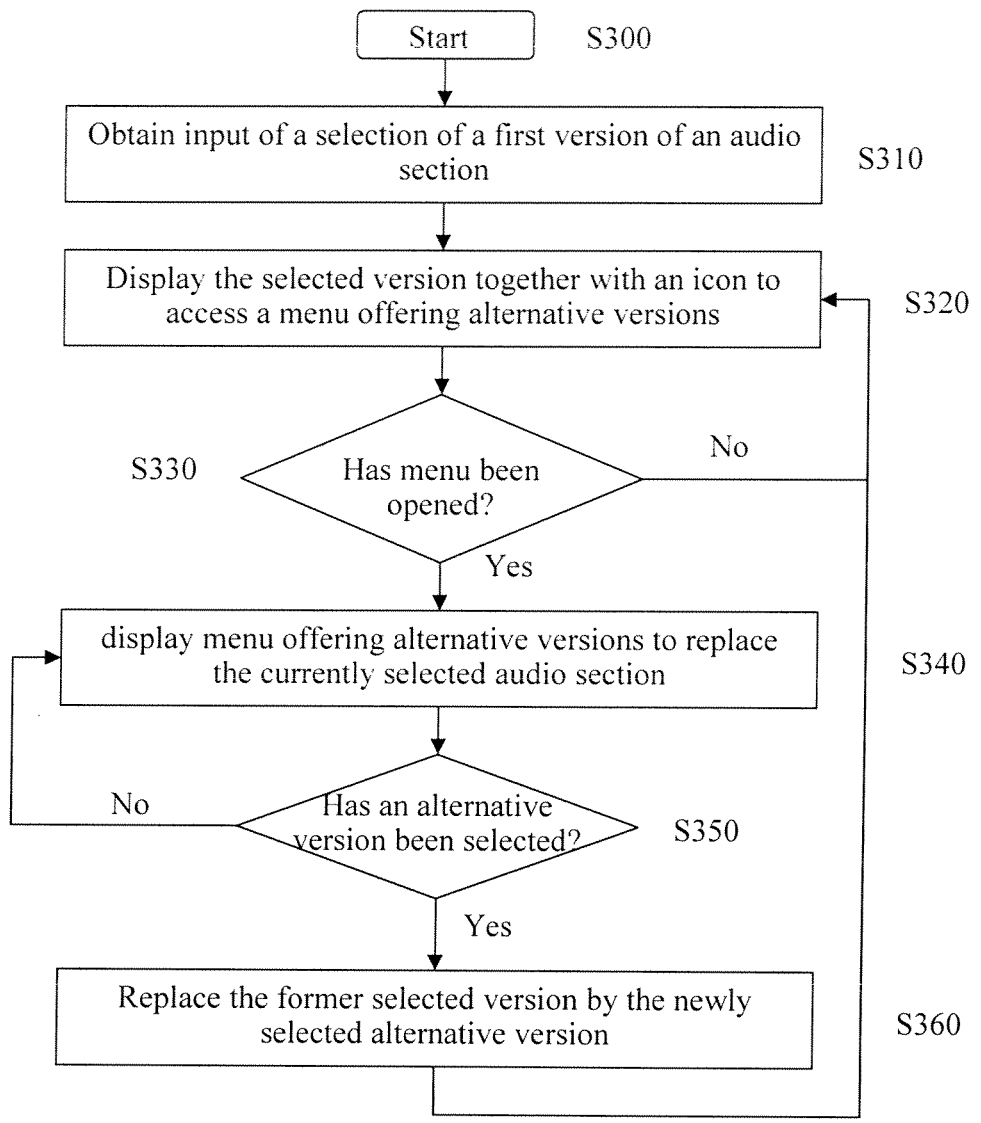
FIG. 3 is a flow chart illustrating operations involved in replacing a version of an audio section.

FIG. 3 shows how a first version 240 of an audio section may be replaced by a second or alternative version of an audio section according to certain implementations. The procedure is started in operation S300. In operation S310, the processing system 10 obtains an input of a selection or a choice of a first version of an audio section having a first length. The user may select a track with a certain property first and select a corresponding audio section afterwards or he may directly select the first version 240 of an audio section for which a corresponding track is then automatically created. The first version may, for example, be loaded from a database or a file may be loaded which contains at least the first version of an audio section. It should be understood that the term first is only meant to distinguish the version from a version selected later on. The first version 240 of an audio section does not imply that a special version has been selected but only designates the selected one.

In operation S320, the selected version which is at this point in time the first version 240 is then displayed in the associated line of the arrange area of the user interface 200. The lateral position of the indication showing that the first version is selected represents the position on the timeline. The timeline may be subdivided by bars as in the examples shown.

Figure 4:
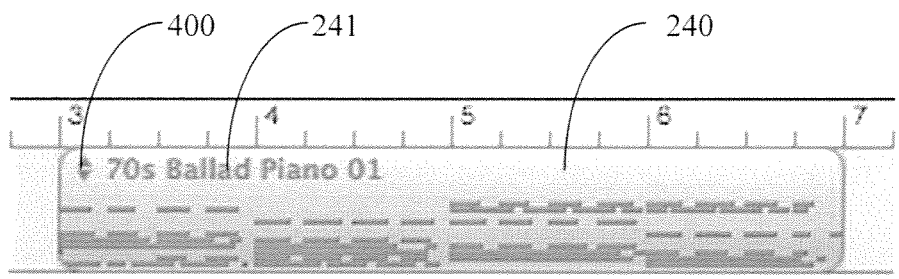
FIG. 4 is a schematic view of an indication showing a version of an audio section.

FIG. 4 gives an example of the indication showing the first version 240 being selected. The start position of this audio section is at bar 3 of the timeline and the end position is at bar 7 of the timeline. As an example, a name 241 of the first version 240 of the audio section may be "70s Ballad Piano 01". The indication showing the first version 240 may additionally show a graphical depiction of its audio content.

In a particular implementation, the indication showing the selected version which is in this example the first version 240 features an icon 400. This icon 400 may be used to open a menu associated with the selected version. For example, a user may point a cursor at icon 400 and then press a button, such as a button on a mouse; in this fashion the menu is caused to be displayed by selecting the icon 400. However, many other implementations are possible to provide access to such a menu.

In operation S330 shown in FIG. 3, it is checked whether a request by the user to open the menu has been obtained by the processing system 10 or not. If there was no request to open the menu, the process will return to operation S320. However, if the user has requested to open the menu, the process will proceed to operation S340.

Figure 5:
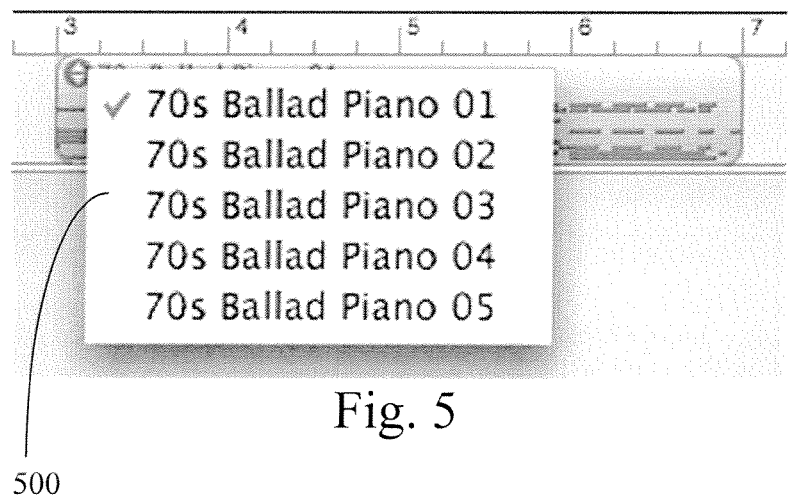
FIG. 5 is a schematic view of an open menu.

In operation S340, the menu is opened. FIG. 5 illustrates such an open menu 500. The menu 500 offers alternative versions to replace the currently selected version which is in this example the first version 240 selected in operation S310. In this implementation of the menu 500, the currently selected version with its name "70s Ballard Piano 01" is listed together with the alternative versions. The menu 500 also shows an indication which of the versions is currently selected. Furthermore, in certain embodiments, the name of the currently selected version and the names of the alternative versions have certain parts in common. In the example of FIG. 5, all versions have the term "70s Ballad Piano" in common. Such a naming can facilitate the organization of a database providing those versions. The computer program executing the process illustrated in FIG. 3 can easily identify alternative versions when using such a scheme for the naming or classification of audio data. This is one of many ways to ensure that only versions which are an appropriate replacement for the currently selected version are offered by the menu 500 in operation S340.

In operation S350 shown in FIG. 3, it is checked whether a selection of an alternative version has been made by the user. If no request has been made, the process will wait for an input. In certain embodiments, if the currently selected version has been confirmed or e.g. a predetermined time has elapsed, the process will return to operation S320 and close the menu 500.

However, if an alternative version has been selected by the user, the process will proceed to operation S360. In operation S360, the menu 500 is closed and the indication showing the first version 240 being selected is replaced by an indication showing that an alternative version, which is called here for convenience a "second version", is selected. The contents corresponding to the versions are replaced at the same time. The new indication, which is called here a "second indication", also features the icon 400 and a name of this second version. Preferably, the start position of the second version is the same as the one of the first version 240. However, the end position depends on the length of the second version. The second version may be equal in length to the first version, but the length of the second version may also be longer or shorter when compared with the first version.

After having replaced the first version by the second version being chosen as an alternative, the process will return to operation S320 and wait for a request to open the menu 500 to replace the currently selected version which is now the second version.

Figure 6:
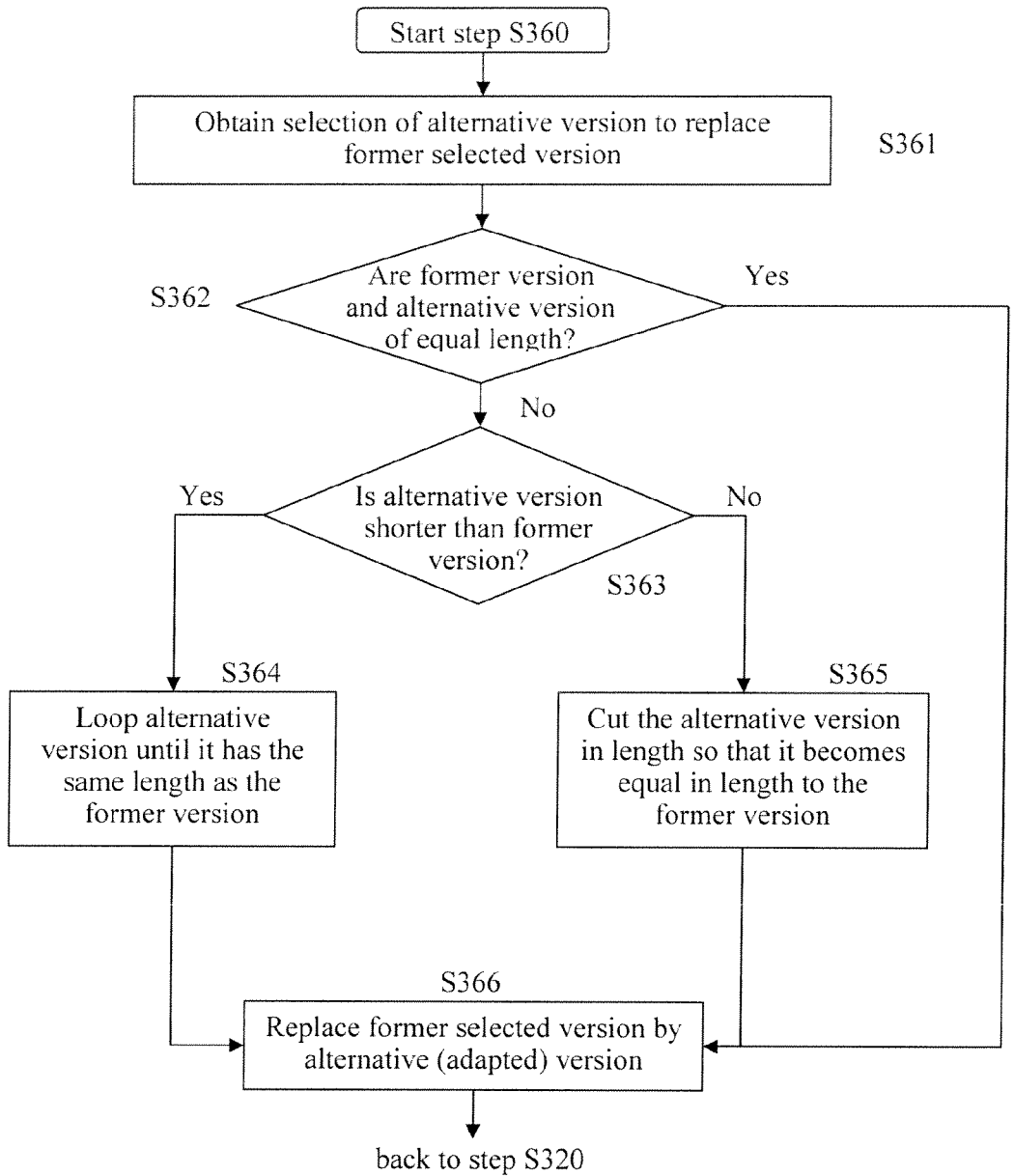
FIG. 6 is a flow chart illustrating operations of a routine involved in replacing a version of an audio section.

FIG. 6 illustrates a particular implementation of the operation S360 shown in FIG. 3. When executing operation S360, first a selection of the alternative or second version is obtained in operation S361 which should replace the former selected or first version. In operation S362, it is checked whether the former selected version and the alternative version are equal in length, i.e. whether their durations in time are the same. If both versions are of equal length, the process will directly go to operation S366 and replace the former selected version by the newly selected alternative version as has been described with respect to operation S360 of FIG. 3. After completing operation S366, the process will return to operation S320 shown in FIG. 3.

If the former version and the newly selected alternative version are not equal in length, the process will proceed to operation S363 shown in FIG. 6. In case the alternative version is shorter than the former version, the process will go to operation S364, otherwise it will go to operation S365.

Figure 7A:
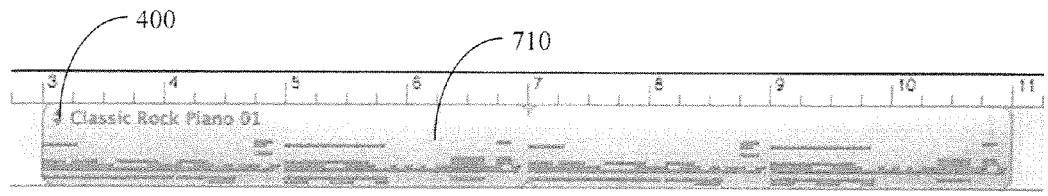
FIGS. 7a and 7b show schematic views illustrating an example of a replacement of a version of an audio section.
Figure 7B:
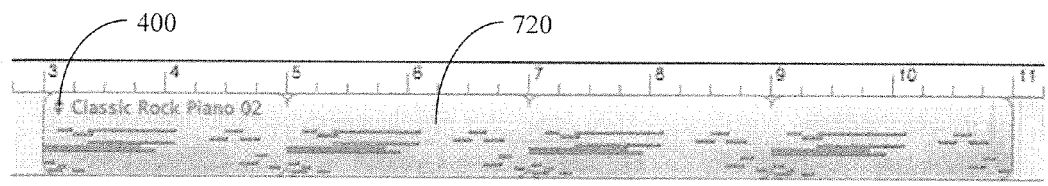

In operation S364, the alternative version is looped until it has the same length as the former version. That means that the content of the alternative version is repeated consecutively until its length fits to the length of the former version. FIGS. 7a and 7b represent an example which is applicable to operation S364. FIG. 7a shows a former version 710 of an audio section which has a length starting from bar 3 and ending at bar 11 of the timeline. In this specific example, the former version 710 is looped one time, i.e. its content is repeated once. This repetition in the former version 710 is indicated by a recess at the bar with the number 7. Accordingly, the user can easily grasp that the content of the former version 710 is repeated once. This former version 710 with the exemplary name "Classic Rock Piano 01" is now to be replaced by an alternative version 720 of an audio section shown in FIG. 7b with the exemplary name "Classic Rock Piano 02". The original length of the alternative version 720 is two bars as can be seen from the recess at bar 5 being two bars after bar 3 which is the starting position of the audio section. The length of the former version 710 is eight bars, whereas the original length of the alternative version 720 is only two bars. Accordingly, the alternative version 720 is altered by looping its content in order to have the same length as the former version 710. In this example, the alternative version 720 is adapted by repeating its content three times resulting in the situation shown in FIG. 7b, where the alternative version is adapted to a length of eight bars by looping its content. The positions where the repetitions begin are indicated by recesses, respectively. In this example of FIGS. 7a and 7b, the process would proceed to operation S366 after having looped the alternative 720 until it has the same length as the former version 710.

Figure 8A:
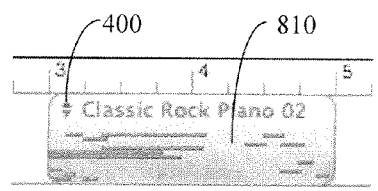
FIGS. 8a and 8b show schematic views illustrating another example of a replacement of a version of an audio section.
Figure 8B:
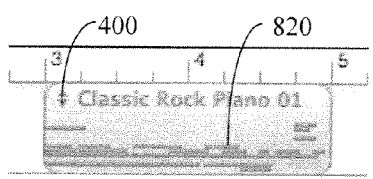

In operation S365, the alternative version is cut in length so that its length becomes equal to the length of the former version which is to be replaced. Preferably, the alternative version is cut from its end (which may be the last in time portion of a time based stream of notes). FIGS. 8a and 8b represent an example which is applicable to operation S365. FIG. 8a shows a former version 810 of an audio section which has a length starting from bar 3 and ending at bar 5 of the timeline. In this specific example, the former version 810 has the name "Classic Rock Piano 02" already known from the example in FIG. 7b. This former version 810 is to be replaced by the alternative version 820 shown in FIG. 8b with the exemplary name "Classic Rock Piano 01". In this example, it is assumed that the original length of "Classic Rock Piano 01" is four bars (without repetition) as was shown in FIG. 7a. Accordingly, the length of the alternative version 820 named "Classic Rock Piano 01" needs to be adapted to a length of only two bars in operation S365. In a particular implementation, everything after the first two bars of the alternative version 820 is cut off so that the alternative version 820 is equal in length to the former version 810 at the end of operation S365. Alternatively, it is possible to cut away a different part of the alternative version in order to reduce it to the length of the former version, e.g. cutting at the start, cutting at the start and at the end, etc. After having cut the alternative version to the length of the former version, the process will go to operation S366.

In another implementation, if the alternative version is shorter than the former version, the content of the alternative version may be looped not by any fraction of its length so that it directly fits to the length of the former version but by an integer multiple of its length. In such a case the alternative version in looped form could become longer than the former version and would therefore be cut afterwards to fit to the length of the former version again.

In operation S366, the former version now having the same length as the alternative version is replaced by that alternative version. This replacement is done as described above. Thereafter, the process goes back to operation S320 shown in FIG. 3.

The implementation described with respect to FIG. 6 ensures that the former or first version is replaced by an alternative or second version which has the same length. As a result, other parts of the audio arrangement will not be influenced. No breaks or overlaps will occur which helps to facilitate arranging, mixing, and producing music projects. Furthermore, replacing of an audio version by another is facilitated by the possibility to use the menu 500 which allows an easy and quick access to select alternative versions. All the principles described above may be used for video (e.g. a movie) or a combination of audio and video as well.

Other implementations are within the scope of the following claims.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
   displaying a first indication having a lateral point on a display device, the lateral point representing a timeline position, the first indication showing the first version of an at least one of an audio and a video section having a first length at the timeline position;
   displaying, on the display device, a menu associated with the first version, the menu offering at least a second version of the at least one of the audio and the video section as an alternative to replace the first version at the timeline position, the second version of the at least one of the audio and the video section having a second length, wherein the menu is overlaid on the first indication and is associated with each selected version offering one or more alternatives to the selected versions;
   receiving a selection of the second version in the menu to replace the first version;
   replacing, automatically and in response to the receiving of the selection of the second version, the first version by the second version at the timeline position;
   displaying a second indication replacing the first indication and having the same lateral point on the display device, the second indication showing the second version of the at least one of the audio and the video section having the second length at the timeline position.

2. The method of claim 1, wherein the replacement comprises fitting the second version having the second length to the first length of the first version so that the second version is made equal in length to the first length.

3. The method of claim 2, wherein the second version is looped one or more times or a fraction thereof if the second length is shorter than the first length, and the second version is cut at an end so that its length is equal to the first length if the second length is larger than the first length.

4. The method of claim 1, wherein the first version is adaptable in length by looping its content or cutting its length.

5. The method of claim 1, wherein at least one of the first and second indication provides a visual indication if at least one of the first and second version is looped.

6. The method of claim 1, wherein the alternatives have a part of their names in common.

7. The method of claim 1, wherein at least one of the first and second indication contains a name of the selected version or a representation indicating the content of the selected version.

8. A program product configured to be executed on a data processing system having a processor and a memory, the program having a program code configured to:
   display a first indication having a lateral point on a display device, the lateral point representing a timeline position, the first indication showing a first version of an at least one of an audio and a video section having the first length at a timeline position;
   provide a menu associated with the first version, the menu offering at least the second version of the at least one of the audio and the video section as an alternative to replace the first version at the timeline position, the second version of the at least one of the audio and the video section having a second length, wherein the menu is overlaid on the first indication and is associated with each selected version to offer one or more alternatives to the selected versions;
   obtain a selection of the second version in the menu to replace the first version;
   replacing, automatically and in response to the receiving of the selection of the second version, the first version by the second version at the timeline position;
   display a second indication replacing the first indication and having the same lateral point on the display device, the second indication showing the second version of the at least one of the audio and the video section having the second length is displayed at the timeline position.

9. The program product of claim 8, wherein the replacement comprises fitting the second version having the second length to the first length of the first version so that the second version is made equal in length to the first length.

10. The program product of claim 9, wherein the second version is looped one or more times or a fraction thereof if the second length is shorter than the first length, and the second version is cut at an end so that its length is equal to the first length if the second length is larger than the first length.

11. The program product of claim 8, wherein the first version is adaptable in length by looping its content or cutting its length.

12. The program product of claim 8, wherein at least one of the first and second indication provides a visual indication if at least one of the first and second version is looped.

13. The program product of claim 8, wherein the alternatives have a part of their names in common.

14. The program product of claim 8, wherein at least one of the first and second indication contains a name of the selected version or a representation indicating the content of the selected version.

15. A data processing system, comprising:
a processor;
a display device communicatively coupled to the processing system; and
an input interface communicatively coupled to the processing system,
wherein the processor system is configured to cause:
the display device to display a first indication having a lateral point on the display device, the lateral point representing a timeline position, the first indication showing of an at least one of an the audio and the video section having a first length at a timeline position;
the display device to provide a menu associated with the first version offering at least the second version of the at least one of the audio and the video section as an alternative to replace the first version at the timeline position, the second version of the at least one of the audio and the video section having a second length, wherein the processor is configured to cause the display device to display the menu overlaid on the first indication and the menus is associated with each selected version offering one or more alternatives to the selected versions;
the input interface to obtain a selection of the second version in the menu to replace the first version;
the automatic replacement of the first version with the second version, in response to the obtaining of the selection of the second version, wherein the processor is configured to cause the automatic replacement of the first version by the second version at the timeline position;
the display device to display a second indication replacing the first indication and having the same lateral point on the display device, the second indication showing that the second version of the at least one of the audio and the video section having the second length at the timeline position.

16. The data processing system of claim 15, wherein the automatic replacement comprises fitting the second version having the second length to the first length of the first version so that the second version is made equal in length to the first length.

17. The data processing system of claim 16, wherein the processor is configured to cause the second version to be looped one or more times or a fraction thereof if the second length is shorter than the first length, and that the second version is cut at an end so that its length is equal to the first length if the second length is longer than the first length.

18. The data processing system of claim 15, wherein the first version is adaptable in length by looping its content or cutting its length.

19. The data processing system of claim 15, wherein at least one of the first and second indication provides a visual indication if at least one of the first and second version is looped.

20. The data processing system of claim 15, wherein the alternatives have a part of their names in common.

21. The data processing system of claim 15, wherein at least one of the first and second indication contains a name of the selected version or a representation indicating a content of the selected version.

* * * * *